United States Patent [19]

Lee et al.

[11] 3,873,627

[45] Mar. 25, 1975

[54] CARBON-TO-CARBON NUCLEAR DIMER COUPLING OF p-ALKYLPHENOLS WITH FERRICYANIDE CATALYSIS

[75] Inventors: Richard J. Lee, Downers Grove; Robert E. Karll, Batavia, both of Ill.

[73] Assignee: Standard Oil Company, Chicago, Ill.

[22] Filed: Oct. 26, 1972

[21] Appl. No.: 301,122

[52] U.S. Cl............ 260/620, 252/47.5, 252/51.5 R, 260/624 R
[51] Int. Cl...................... C07c 37/14, C07c 39/12
[58] Field of Search........................ 260/620, 619 R

[56] References Cited
UNITED STATES PATENTS
2,057,676  10/1936  Graves............................ 260/620 X
2,651,644  9/1953  Gisvold........................... 260/620 X Primary Examiner—Leon Zitver
Assistant Examiner—Norman P. Morgenstern
Attorney, Agent, or Firm—Fred R. Ahlers; Arthur G. Gilkes; William T. McClain

[57] ABSTRACT

Derivatives of dimeric nuclear carbon-to-carbon coupled p-alkylphenol have higher activity as lubricating oil addition agents than the same derivative of present p-alkylphenol. For example, sulfonamide or methylene-imine (i.e., product of Mannich Reaction) derivatives of dimeric coupled p-alkylphenol sulfonylchloride or dimeric coupled alkylphenol are more active dispersants than the same sulfonamide or methyleneamine derivative of the parent alkylphenolsulfonyl chloride or p-alkylphenol. Such dimeric p-alkylphenols can be prepared by oxidative coupling in aqueous alkaline medium in presence of potassium ferricyanide.

2 Claims, No Drawings

CARBON-TO-CARBON NUCLEAR DIMER COUPLING OF p-ALKYLPHENOLS WITH FERRICYANIDE CATALYSIS

BACKGROUND OF INVENTION

2-Hydroxy-4-alkylbenzenesulfonamides of polyamines such as an ethylene polyamines, wherein there are 1–10 divalent ethylene groups and 2–11 amino groups of which two are primary and 0–9 are secondary amine groups; the bis(aminoalkyl)piperazine, wherein the alkyl group has 1–10 carbon atoms; and the alpha, omega alkylene diamines, wherein the alkylene group has 3 to 12 carbon atoms, are useful addition agents for lubricating oils imparting detergency and oxidation inhibition thereto wherein the nuclear alkyl-substituent has a molecular weight of 300 to 3,000. Such sulfonamides are obtained by reacting those polyamines with hydroxy, alkylbenzenesulfonyl chloride.

Mannich Reaction products derived from alkylphenol, formaldehyde and an amine especially the foregoing polyamines also are useful addition agents for lubricating oils. Products of such Mannich Reaction using alkylphenols wherein the alkyl group has from 6 to about 25 carbon atoms (i.e., in alkyl group from dimethylbutyl to wax derived alkyl groups) are used as calcium phenate salts for their anti-oxidant properties. But Mannich Reaction products derived from alkylphenols whose alkyl-substituent has a molecular weight in the range of 300 to 3,000 and higher are useful per se in lubricating oils to impart detergency and dispersancy to such oils.

It has been discovered that the activity of such sulfonamides and products of the Mannich Reaction can be increased by using sulfonyl chloride of dimer nuclear coupled alkylphenol or the coupled phenol in place of the hydroxy, alkylbenzenesulfonyl chloride or alkylphenol reactants. The sulfonylchloride of dimer nuclear coupled alkylphenol is readily prepared by conventional chlorosulfonation using chlorosulfonic acid.

SUMMARY OF INVENTION

Dimeric carbon-to-carbon nuclear p-alkylphenol is prepared by oxidative coupling of two molecules of p-alkylphenol in an aqueous alkaline medium in the presence of potassium ferricyanide at temperatures in the range of 25° to 300°F. and in the absence of oxygen for at least one hour. Neither the p-alkylphenol nor its dimeric nuclear coupled product are soluble in the aqueous alkaline medium. The dimeric product is readily separated from the reaction medium by mixing it with a $C_6$–$C_{10}$ alkane hydrocarbon, settling the mixture into two phases, an organic phase and an aqueous phase, and removing the aqueous phase. Solidliquid separation (e.g., filtration or centrifugation) removes most inorganic salts. Water washing of the organic phase will remove all the inorganic salts. The dimeric coupled p-alkylphenol per se is recovered by removal of the alkane hydrocarbon by evaporation or distillation.

Such dimer nuclear coupling results, when two molecules of the same p-alkylphenol are involved, in the disubstituted biphenyl having the formula:

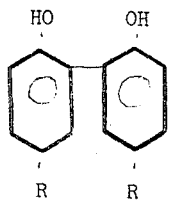

joined by the indicated nuclear carbon-to-carbon linkage and not the nuclear carbon-oxygen-nuclear carbon linkage in the preparation of linear polymers of hydroxy, alkyl-substituted phenoxy either sought by others using oxidative coupling systems.

The primary objective of the present invention is not in symetrical dihydroxy, dialkyl bisphenyl compounds of the above formula wherein both R groups are indicated as being the same and their preparation. But rather the primary objective of the present invention is in the dihydroxy, dialkyl biphenyl compounds unsymetrical only with respect to the size of the p-alkyl-substituents and their preparation. Such dihydroxy, dialkyl biphenyl compounds are, of course, geometrically symetrical with respect to their nuclear carbon-to-carbon coupling which is believed to be ortho with respect to the rather strong, reactionwise, ortho-directing hydroxy group. Such objective of the present invention does not infer separate preparation of two p-alkylphenols differing in size of their alkyl-substituents, although such possibility is within the ambit of the present invention, mixing such two different p-alkylphenols and practicing the oxidative coupling in the presence of the catalysis before defined. Rather the present inventive oxidative coupling is practiced with mixtures of p-alkylphenols having different size alkyl groups naturally occurring from the catalytic alkylation of phenol with olefinic hydrocarbons such as fractions of petroleum and mixtures of synthesized olefinic hydrocarbons such as polypropene, polybutenes, copolymers of propene with ethylene high in ethylene derived units, copolymers of the various butenes such as copolymers of isobutene and one or both of butene-1 and butene-2 or mixtures of such butenes also containing butadiene-1,4 and butane hydrocarbons as are present in petroleum refinery B-B streams. Such synthesized olefinic hydrocarbon polymers are well known, and are, in general, prepared by polymerizations using a Friedel-Crafts catalyst or modification thereof under known conditions and are viscous liquid to semi-solid polymeric products. Such synthesized olefinic hydrocarbon polymers as prepared also are known to be mixtures of polymeric hydrocarbons whose individual molecules have a rather broad molecular weight distribution following the classical probability curve when the weight distribution of particular fractions as ordinate are plotted against molecular weight of such fractions as abscissa. Specific products of such synthesis of olefinic hydrocarbon polymers are, for that reason, properly characterized by their number average molecular weight indicated by the symbol $\overline{M}_n$. Such synthesized olefinic-hydrocarbon polymers and selected distillative fractions thereof are products having 300 to 3,000 $\overline{M}_n$.

Also used for alkylating phenol to prepare alkylphenol intermediates for preparation of addition agents for lubricating oils are the $C_6$ to $C_{12}$ alkenes (85 to 169 MW) which are generally substantially only single molecular species and $C_{12}$ to $C_{32}$ alkenes (169 to 449 MW) such as cracked wax hydrocarbons whose recoverable products are molecules of from 12 to 32 carbon atom range with individual fractions composed of hydrocarbons differing in size by two carbons such as a mixture of $C_{14}$–$C_{16}$ or $C_{20}$ to $C_{22}$, etc. carbon atoms. Thus, the p-alkyl-substituted phenols used are those wherein the alkyl-substituent has a molecular weight in the range of 85 to 3,000.

The products resulting from catalytic alkylation of phenol with the foregoing mixtures of olefinic hydrocarbons, while mainly p-alkylphenols, are not, as a rule, statistical mixtures of p-alkyl-substituted phenols wherein the product distribution with respect to alkyl-substituents are the same as in the mixture of olefinic hydrocarbon alkylating agent. Rather the mixture of alkylphenols from any given catalytic alkylation reaction will deviate from that distribution in the alkylating agent according to the effect of the alkylation conditions on the alkylating agent, that is the combined effects of temperature and catalyst on the alkylating hydrocarbon. Such alkylation catalysts as Friedel-Crafts ($AlCl_3$ or $BF_3$), toluene sulfonic acids, alkanesulfonic acids, sulfuric acid, sulfonic acid modified ion exchange resins, phosphoric acid saturated with $BF_3$, $BF_3$ diethyl etherate and $BF_3$-phenolate have different fragmenting effects on the alkylating hydrocarbon depending upon its size. Most of these catalysts have little effect on olefinic alkylating agents having up to 20 carbon atoms (e.g., up to 280 MW) and the $BF_3$-phenolate (or $BF_3$-phenol complex) appears to be the catalyst of choice over a temperature range of 60°–100°C. because the combination of such catalyst and temperature has little effect in causing the formation of smaller fragments of the alkylating olefin downward from 280 MW. $BF_3$-phenolate appears to have little fragmentation effect on polypropene alkylating agents over the range of 300 to 3,000 $\overline{M}_n$ at alkylation temperatures from 80° to 250°C. although some minor molecular weight decrease from average size alkylating polypropene to average size of nuclear substituted polypropyl group on the phenol does occur at temperatures of 150°C. However, polybutene alkylating agents of 300 to 3,000 $\overline{M}_n$ and higher are fragmented severly at temperatures above 80°C. in the presence of any of the foregoing alkylation catalysts but such fragmentation of polybutene alkylating agents can be restricted to an acceptable level, about a 10% reduction of average molecular weight, at temperatures below 85°C., e.g., in the range of 0° to 82°C. using 0.1 to 1.1 mole $BF_3$ with 1.1 to 2.2 moles phenol per mole of polybutene alkylating agent.

The primary object of the present invention is to couple a p-alkylphenol mixture and obtain a mixture of coupled products having a $\overline{M}_n$ of at least 50% greater than the $\overline{M}_n$ of the p-alkylphenol mixture. Preferably the primary object is to couple a p-polybutylphenol mixture of 300 to 3,000 $\overline{M}_n$ to a mixture of coupled p-polybutylphenol having a $\overline{M}_n$ of at least 450 to 4,500.

The secondary object of the present invention is to oxidatively couple two molecules of the same p-alkylphenol to the symetrical dimeric dihydroxy, dialkyl biphenyl compound.

SPECIFIC EMBODIMENTS

The aqueous alkaline reaction medium is conveniently provided by a mixture of water-soluble lower alkanol such as methanol, ethanol or isopropanol and sodium or potassium carbonate. The aqueous alkaline reaction medium dissolves potassium ferricyanide and emulsifies the solution and p-alkylphenol for better reaction contact. Potassium ferricyanide and p-alkylphenol are used in substantially equal molecular proportions. The amount of carbonate is in the range of 1.0 to 2.0 moles per mole of p-alkylphenol. However, neither sodium nor potassium phenates form during said coupling. The ratio of alkanol to water suitably is in the respective valence ratio of 1.0:0.5-2.0. The amount of $C_6$-$C_{10}$ alkane used to form the two phases can conveniently be in the range of 0.5 to 2.0 liters per mole of p-alkylphenol. As before stated the coupling reaction is conducted in the absence of oxygen and this condition can be provided by displacing air with an atmosphere of inert gas such as $CO_2$, nitrogen or water vapor.

The following examples will illustrate the coupling reaction of this invention.

EXAMPLE I

To 1,800 grams of lubricant oil weight hydrocarbon solution containing 44.5 weight percent (0.5 mole) p-polybutylphenol of 1,600 $\overline{M}_n$ there is added one liter of ethanol, 165 grams (0.5 mole) potassium ferricyanide and 300 ml. of water. The mixture is stirred thoroughly and to the stirred mixture there are added 100 grams (0.945 mole) sodium carbonate and 100 ml. of water. The resulting stirred emulsion is heated under nitrogen atmosphere to a temperature of 160°F. and held at that temperature in a nitrogen atmosphere for two hours. The resulting reaction emulsion is diluted with one liter of hexane and this mixture is thoroughly stirred, filtered and then hexane is removed by distillation. The residue is found to contain 47.7 weight percent (the remainder is original hydrocarbon solvent) of coupled p-polybutylphenol of 2,215 $\overline{M}_n$ which is about a 38.5% increase in $\overline{M}_n$.

EXAMPLE II

The method of Example 1 is repeated except the stirred alkaline emulsion is held between a temperature of 28°–35°F. for 2 hours, diluted with 2700 ml. iso-octane, filtered, iso-octane removed by distillation and the residue washed with water and dried. The washed and dried residue was found to contain 41.0 weight percent of coupled p-polybutylphenol of 2804 $\overline{M}_n$.

EXAMPLE III

To 1.1 moles of 846 $M_n$ p-polypropylphenol (polypropyl group of 753 $\overline{M}_n$) as 43% solute in hydrocarbon solvent of light weight lubricant oil type (2,140 grams of solution) there are added 1,500 ml. ethanol and one mole (330 grams) potassium ferricyanide in 400 ml. of water. This mixture is thoroughly stirred and then 1.5 moles (159 grams) of sodium carbonate and 41 grams of water are added. The mixture is stirred and slowly heated under a nitrogen atmosphere to reach a temperature of 250°F. over a period of 4 hours. Thereafter the resulting mixture is washed with water three times. Each time the water-reaction mixture was settled and the aqueous phase was drawn off. After the last wash the organic phase is dried and then dissolved in two liters of hexane. The coupled p-polypropylphenol in said solution is found to have a $\overline{M}_n$ of about 1,400.

EXAMPLE IV

One mole (218 grams) p-nonylphenol dissolved in one liter iso-octane is added to aqueous isopropanol containing one liter isopropanol, 0.5 liter water and one mole potassium ferricyanide. The mixture is thoroughly stirred and sufficient potassium carbonate is added to the stirred mixture to form an emulsion of the organic phase in the aqueous isopropanol phase. Air atmosphere above said emulsion is displaced with a nitrogen atmosphere which is maintained while the emulsion is heated to a temperature of 230°F. and maintained at such temperature for three hours. Thereafter stirring of the emulsion is stopped and the mixture is permitted to settle. The aqueous phase is withdrawn and the organic phase is filtered. The filtrate is washed three times with water and each aqueous wash layer upon settling is withdrawn. The washed organic phase is heated to remove iso-octane by distillation. In this manner 1,1'-dihydroxy-4,4'-dinonyl-2,2'biphenyl can be recovered as distillation residue.

EXAMPLE V

To 0.34 mole of the coupled p-polybutylphenol (2,215 MW) of Example I there is added 64.5 grams (0.34 mole) tetraethylene pentamine. This mixture is stirred and to the stirred mixture there is slowly added 60 grams of 37% formaldehyde (0.74 mole $CH_2O$) solution (formalin) at ambient temperature. A 10°F. temperature rise of the stirred mixture occurred during formalin addition. Thereafter the stirred mixture is heated to 320°F. and nitrogen gas is injected into the mixture starting at the time its temperature reached 200°F. to assist in removal of by-product water. The water-free solution is diluted with 437 grams of SAE 5W grade oil and the oil diluted solution is heated to and held at 320°F. for two hours and then filtered at 320°F. through a cellite cake on a filter. The filtrate contains 40 weight percent of the product of said Mannich Reaction.

EXAMPLE VI

The Mannich Reaction of Example V is repeated except there are used coupled p-polybutylphenol of 2354 $\overline{M}_n$ (1600 $\overline{M}_n$ p-polybutylphenol coupled as described in Example I), tetraethylene pentamine and formaldehyde in the respective molar ratio of reactants of 1.0:1.39:2.78. The product solution contained 40 weight percent of Mannich Reaction product.

EXAMPLE VII

The coupled p-polypropylphenol obtained in hexane solution in Example III is converted to its sulfonyl chloride by adding dropwise 1.3 moles (151 grams) chlorosulfonic acid to the hexane solution with stirring thereof. Thereafter the hexane solution is heated in a vessel having a reflux condenser to the temperature at which a reflux of hexane is obtained and held at such temperature and hexane reflux for two hours. The solution of chlorosulfonated product is allowed to settle and the sulfuric acid sludge layer is withdrawn. The chlorosulfonated product in hexane is converted to its disulfonamide of bis-aminopropyl piperazine by adding to the hexane solution 130 grams of said substituted piperazine dissolved in 0.2 liter of pyridine. Hydrogen chloride by-product is removed by addition of 48 grams calcium hydroxide. The resulting mixture is heated to remove pyridine and hexane. The residue is diluted with 500 grams SAE 5W grade oil and the oil diluted solution is filtered to remove calcium chloride. The filtered, oil diluted solution is found to contain 40 weight percent of said disulfonamide, 1.2% nitrogen (theoretical nitrogen content is 1.3%) and 1.1% sulfur (0.8% is theoretical content).

The product of Example VII at 5.0 volume percent in lubricating oil limited increase of 100°F. viscosity to 150–180 SSU units in 24 hours use in Cadillac engine crankcase. Viscosity increase of 300–600 SSU units (100°F.) is otherwise experienced. The corresponding sulfonamide of bis-amino propyl piperazine from the sulfonyl chloride of 846 $\overline{M}_n$ p-polypropylphenol has little effect on reducing 100°F. viscosity increase in 24 hours.

The oil solution product of Example VI (40 weight percent Mannich Reaction product) and a 40 weight percent oil solution of similar Mannich Reaction product from 1,600 $\overline{M}_n$ p-polybutylphenol, tetraethylene pentamine and formaldehyde (Comparative Product) are dissolved as dispersancy addition agents in a used crankcase lubricating oil containing sludge common in such drained used oil in concentrations to provide 0.5, 1.0 and 2.0 grams of the respective Mannich Reaction product solute for each 20 grams of sludge in said drained used oil. Equal amounts of the drained used oil (control) and each of the drained used oil containing those Mannich Reaction products are heated to a temperature of 300°F. and held at said temperature for 3 hours. Thereafter five drops of each heated oil are placed on separately marked and identified areas of blotting paper. The blotting paper is held at ambient (77°) temperature for 72 hours. At the third, nineteenth and seventy-second hour there was measured both the oil ring (Do) and sludge ring (Ds) and the ratio Ds/Do × 100 is calculated for each oil deposited on the blotting paper. The ratio calculated are in TABLE I.

TABLE I

| Oil Composition | Additive-Grams per 20 grams Sludge | Calculated Ratio:Ds/Do × 100 | | |
|---|---|---|---|---|
| | | 3 Hours | 19 Hours | 72 Hours |
| Control Drained used oil | 0.5 | 68 | Not Calculated | 42 |
| Comparative Mannich Reaction Product | 0.5 | 87 | 67 | 54 |
| | 0.1 | 92 | 74 | 62 |
| | 2.0 | 95 | 82 | 68.5 |
| Mannich Reaction Product of Example VI | 0.5 | 87 | 73 | 61 |
| | 1.0 | 93 | 76 | 66 |
| | 2.0 | 100 | 81 | 76 |

On the bases of the above-calculated ratios indicative of sludge dispersing effectiveness of the additive, the Mannich Reaction product of Example VI is more effective than the Comparative Mannich Reaction product even though the Mannich Reaction product of Example VI is used on a lower mole to sludge concentration.

The product of Example IV is converted to the calcium phenate of the Mannich Reaction product with ethylene diamine, formaldehyde and calcium hydroxide used in the respective molar ratio of 1.0:1.0:1.0:1.0. A similar calcium phenate is prepared from 846 $\overline{M}_n$ p-polypropylphenol, respective molar ratio of 1.0:1.0:1.0:1.0. The two Mannich Reaction products at the same weight concentration are tested in a lubricating oil for their anti-corrosion properties, the calcium phenate of the Mannich Reaction product of Example IV will be found to be more effective.

What is claimed is:

1. A method of nuclear carbon-to-carbon coupling of p-alkyl-substituted phenol, wherein the alkyl-substituent has a molecular weight in the range of 85 to 3,000, which method comprises combining equal molar proportions of said p-alkylphenol and potassium ferricyanide with a water-soluble lower alkanol and sodium or potassium carbonate and water to dissolve said carbonate and said ferricyanide and emulsify the p-alkyl-substituted phenol, maintaining said emulsion in the absence of oxygen at a temperature in the range of 25° to 300°F. for at least one hour, adding a $C_6$-$C_{10}$ alkane hydrocarbon to the emulsion in an amount to dissolve the p-alkylphenol, separating the aqueous phase from the organic phase and removing the alkane to recover said nuclear coupled p-alkylphenol product.

2. The method of claim 1 wherein the alkyl-substituent is polypropyl or polybutyl of 300 to 3,000 $M_n$, the alkane is hexane, the alkanol is ethanol and the carbonate is sodium carbonate.

* * * * *